United States Patent
Dziurda

(10) Patent No.: US 9,453,542 B2
(45) Date of Patent: Sep. 27, 2016

(54) HELICAL ONE WAY CLUTCHES

(75) Inventor: Robert Alan Dziurda, Waterford, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 1175 days.

(21) Appl. No.: 13/428,815

(22) Filed: Mar. 23, 2012

(65) Prior Publication Data
US 2013/0248314 A1    Sep. 26, 2013

(51) Int. Cl.
| | |
|---|---|
| *B60T 7/12* | (2006.01) |
| *F16D 41/00* | (2006.01) |
| *F16D 11/14* | (2006.01) |
| *B60T 1/06* | (2006.01) |
| *F16D 43/28* | (2006.01) |
| *F16D 41/08* | (2006.01) |
| *B60T 1/00* | (2006.01) |

(52) U.S. Cl.
CPC ............... *F16D 41/00* (2013.01); *B60T 1/005* (2013.01); *B60T 1/062* (2013.01); *B60T 7/122* (2013.01); *F16D 11/14* (2013.01); *F16D 41/08* (2013.01); *F16D 43/28* (2013.01)

(58) Field of Classification Search
CPC .................................. F16D 11/14; B60T 7/122
USPC ............................................ 192/219.2, 69.81
See application file for complete search history.

(56) References Cited

U.S. PATENT DOCUMENTS

| | | | | |
|---|---|---|---|---|
| 624,239 | A * | 5/1899 | Norton ................... | B61H 13/04 188/82.3 |
| 1,631,843 | A * | 6/1927 | Balamuki ............... | B60T 7/122 188/30 |
| 1,717,232 | A * | 6/1929 | Lacy ....................... | B60T 7/122 188/30 |
| 1,810,998 | A * | 6/1931 | Bjork ...................... | B60T 7/122 188/30 |
| 2,398,570 | A * | 4/1946 | Wildhaber ................. | 192/69.81 |
| 2,555,593 | A * | 6/1951 | Lee ................................. | 73/321 |
| 2,633,218 | A * | 3/1953 | Pielstick .................... | 192/85.18 |
| 2,639,795 | A * | 5/1953 | Munschauer ................ | 192/69.8 |
| 4,462,271 | A * | 7/1984 | Stieg ..................... | B60K 17/346 180/250 |

\* cited by examiner

*Primary Examiner* — Terry Chau

(57) ABSTRACT

Improvements in one way clutches include a first embodiment directed to a one way clutch having two sets of helical teeth arranged about the axis of rotation of a drive and driven member that translate axially into and out of engagement. The one way clutch is biased into engagement by a wave washer or similar device. As the speed of rotation of the clutch increases, hydraulic fluid which is directed axially against the drive member by a dam urges the drive member away from the driven member and opens the clutch. In a second embodiment, a pair of one way clutches having oppositely arranged sets of helical teeth selectively provide one way or overrunning operation in both directions. In this embodiment, each of the drive members may be selectively engaged with the driven member by a hydraulic piston. Respective return springs bias the pistons and drive members toward disengaged positions.

13 Claims, 2 Drawing Sheets

HELICAL ONE WAY CLUTCHES

FIELD

The present disclosure relates to clutches for use in motor vehicle powertrains and more particularly to one way or overrunning helical clutches for use in motor vehicle powertrains.

BACKGROUND

The statements in this section merely provide background information related to the present disclosure and may or may not constitute prior art.

A one way or overrunning clutch is an ingenious mechanical device typically associated with two co-axial or concentric components in a power or torque transmitting assembly or machine. The unique feature or capability of a one way clutch is its action in response to opposite relative rotational motion between its two or more components. When, in one direction, a first component attempts to drive or rotate faster than a second component, a one way clutch releases, allows the faster first component to freewheel and transfers essentially no torque. In the opposite rotational direction, unless the second component is rotating faster than the first component, the one way clutch locks and transfers or reacts torque from the first component to the second component up to the torque carrying limit of the clutch. When the second component is the torque input or drive member, the one way clutch operates in the reverse manner.

Because of their unique function and capability, one way or overrunning clutches have found broad application in mechanical power transfer devices such as multiple speed transmissions utilized in motor vehicles. For example, a one way clutch may restrain, i.e., ground, a transmission component in reverse and allow it to freely rotate in a forward gear or the one way clutch may restrain a component in one speed range or gear ratio and release it in another speed range or gear ratio.

There are several common one way clutch configurations. A sprag one way clutch utilizes a pair of concentric rings that nominally function as the input and output members and a plurality of oblique bars or sprags disposed between the rings. In one direction of relative rotation, the sprags are urged to tilt or relax such that one ring readily rotates (freewheels) relative to the other. With the opposite direction of relative rotation, the sprags move toward a more radial position and lock the inner and outer rings together. Ball ramp one way clutches utilize a plurality of ball bearings between the rings and corresponding ramps on the inner surface of one of the rings. Again, in one direction of relative rotation, the balls are urged to the bottom of the ramps and the rings freewheel. Relative rotation in the opposite direction causes the ball bearings to ride up the ramps, engage the other ring and lock them together.

While these and other, similar one way clutch configurations function well when the device has a relatively small diameter such as would be utilized with a shaft, engineering complications arise as the diameter of the controlled mechanical element becomes large. For example, in a transmission having a plurality of planetary gear assemblies, it may be unavoidable that a one way clutch must be installed about the ring gear of a planetary gear assembly. A one way clutch so mounted will require a large number of sprags or ball bearings in addition to much larger races. The device will thus weigh significantly more than a smaller, shaft mounted clutch.

SUMMARY

The present invention provides improvements in one way clutches. A first embodiment is directed to a one way clutch having two sets of helical teeth arranged about the axis of rotation of a drive and driven member that translate axially into and out of engagement. The one way clutch is biased into engagement by a wave washer or similar device. As the speed of rotation of the clutch increases, hydraulic fluid which is directed axially against the drive member by a dam urges the drive member away from the driven member and opens the clutch. In a second embodiment, a pair of one way clutches having sets of oppositely arranged helical teeth selectively provide one way or overrunning operation in both directions. In this embodiment, each of the drive members may be selectively engaged with the driven member by a control piston. Respective return springs bias the pistons and drive members toward disengaged positions. In both embodiments, the angle of the helical teeth, the magnitude of the hydraulic force and the magnitude of the spring force primarily determine the one way lock and release thresholds.

Thus it is an aspect of the present invention to provide one way or overrunning clutches.

It is a further aspect of the present invention to provide one way or overrunning clutches having mating, opposed helical teeth.

It is a still further aspect of the present invention to provide one way or overrunning clutches having mating, helical teeth on opposed drive and driven members.

It is a still further aspect of the present invention to provide one way or overrunning clutches having hydraulically translated drive and driven members.

It is a still further aspect of the present invention to provide one way or overrunning clutches having spring biased drive and driven members.

It is a still further aspect of the present invention to provide one way or overrunning clutches having spring biased, opposed drive and driven members.

It is a still further aspect of the present invention to provide one way or overrunning clutches having spring biased, opposed drive and driven members having helical teeth.

It is a still further aspect of the present invention to provide one way or overrunning clutches having spring biased, hydraulically translated, opposed drive and driven members having helical teeth.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be understood that the inventor is aware of a certain preference to describe or refer to a selectable coupling device between two rotating members as a "clutch" whereas the same device between a rotating member and a stationary member is described or referred to as a "brake." With regard to one way or overrunning clutches, the inventor, however, does not subscribe to this convention and prefers to and herein has referred to such devices, whether they are disposed between two rotating members or one rotating and one stationary member as one way, freewheeling or overrunning clutches. This preference is consistent with his long experience in industry wherein only the term "clutch" is utilized with "one way," "overrunning" or "freewheeling" to describe and refer to such a device utilized either as a clutch (between two rotating elements) or a brake (between a rotating and a stationary element). He has, however, in certain locations in the text, inserted the parenthetical "(brake)" to clarify the description of a one way or overrunning clutch disposed between rotating and stationary members and acknowledge the above-noted alternate naming convention.

Figure 1:
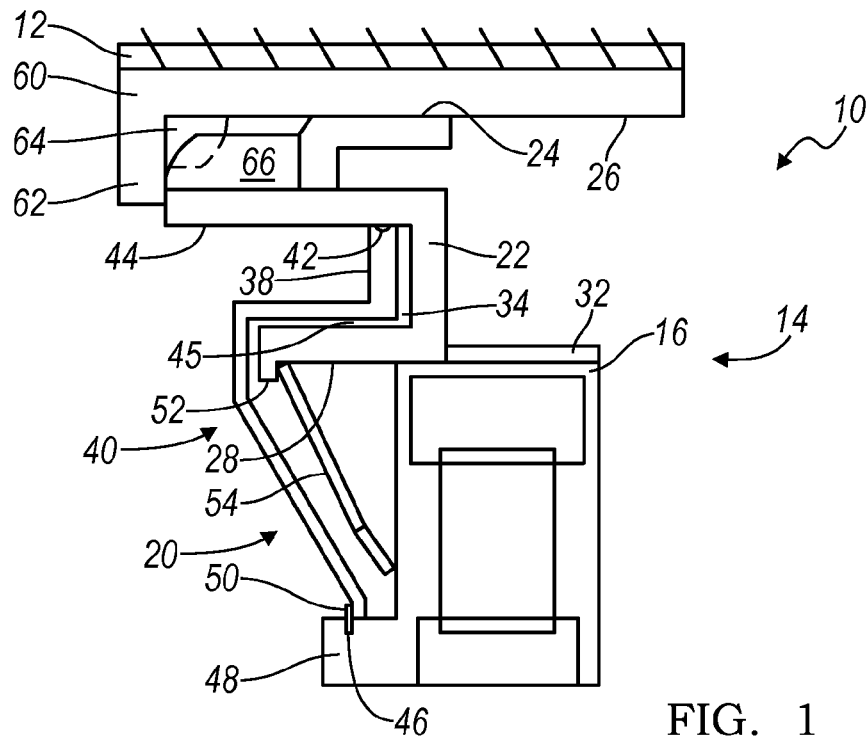
FIG. 1 is a sectional view of a first embodiment of a one way or overrunning clutch having opposed sets of helical teeth according to the present invention in a fully engaged position.

Referring now to FIG. 1, a portion of a transmission incorporating the present invention is illustrated and generally designated by the reference number 10. The transmission 10 which may by a component of a motor vehicle powertrain (not illustrated) or other torque transferring assembly includes a stationary housing 12 which locates, supports and protects various components of the transmission 10 and a rotating element 14 such as a shaft, collar, quill or component of, for example, a planetary gear assembly. If the rotating element 14 is a component of a planetary gear assembly, it may typically be a ring gear or a planetary gear carrier 16 as illustrated in FIG. 1.

Operably disposed between the planet gear carrier 16 and the stationary housing 12 is a first embodiment of a one way or overrunning clutch (brake) assembly 20 according to the present invention. The one way clutch assembly 20 includes an axially translatable collar or annular inner first or input member 22 having a smooth outer circumferential pilot journal surface 24 which is adjacent and slides along a complementary inner annular pilot surface 26. The inner surface 22 of the collar or member 22 includes female splines 28 that mate with and engage complementary male splines 32 on the outer periphery of the planet gear carrier 16. Thus, the collar or member 22 always rotates with the planet gear carrier 16 or other rotating member 14 and independently rotates and translates with regard to the housing 12.

The collar or inner member 22 defines an annular re-entrant region or fluid chamber 34 which receives a flat, circular, outer portion 38 of a circular lubrication dam 40.

The lubrication dam 40 includes an O-ring or similar seal 42 about the circumference of the flat, circular portion 38 which provides a fluid tight seal against an inner wall 44 of the collar or member 22 and defines an annular passageway or orifice 45 at the inner end of the flat, circular portion 38. An inner edge 46 of the lubrication dam 40 seats against a hub 48 of the rotating member 14 and is retained in this location by a snap ring 50 or similar mechanical component.

The collar or inner member 22 includes a radially inwardly directed lip or stop 52 which is engaged by and retains an engagement spring 54 such as a wave washer, Belleville spring, coil packs or similar component or components. The engagement spring 54 biases the collar or member 22 to the left in FIG. 1.

Figure 2:
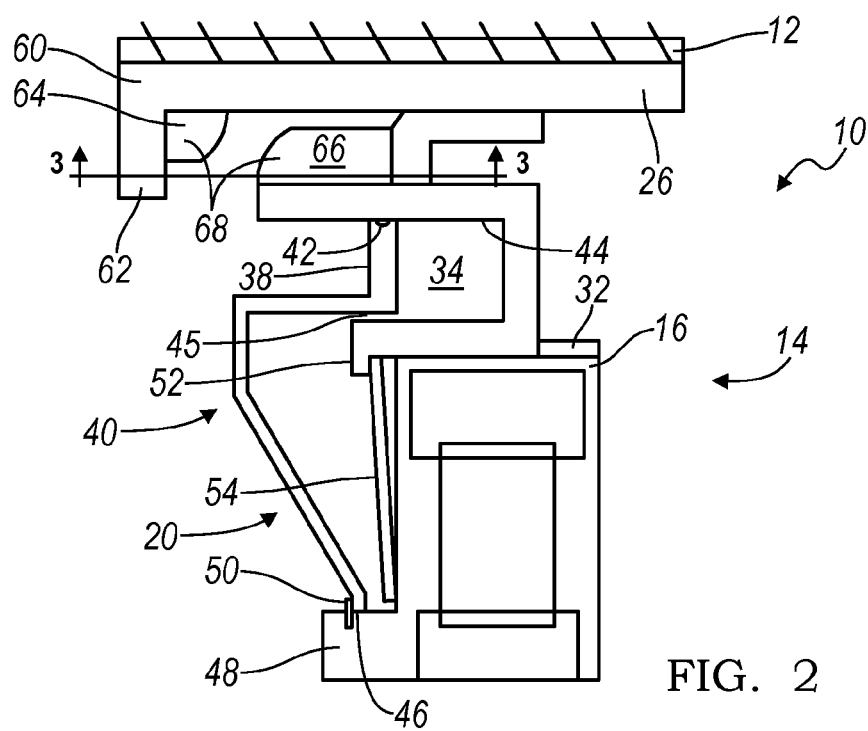
FIG. 2 is a sectional view of a first embodiment of a one way or overrunning clutch having opposed sets of helical teeth according to the present invention in a fully disengaged position.
Figure 3:
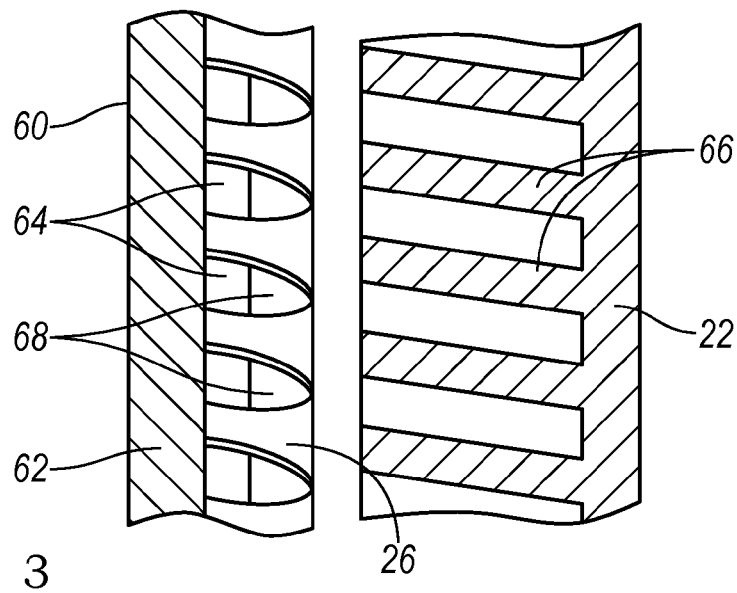
FIG. 3 is a fragmentary sectional view of the sets of opposed teeth in a one way or overrunning clutch according to the present invention taken along line 3-3 of FIG. 2.

Referring now to FIGS. 1, 2 and 3, the one way or overrunning clutch assembly 20 also includes an outer or second member 60 which may be an insert in the housing 12 or may be integrally formed therewith. The outer member 60 includes an inwardly extending flange or stop 62 against which the collar or inner member 22 abuts when it is in the fully engaged position as illustrated in FIG. 1. The outer member 60 includes a first plurality of helical teeth 64 adjacent the stop 62 and the inner surface 26. Aligned with and opposing the first plurality of helical teeth 64 are a complementary, second plurality of helical teeth 66 formed on the collar or inner member 22. As illustrated in FIG. 3, the adjacent (opposing) ends of the helical teeth 64 and 66 define tapered terminal portions 68, i.e., have reduced height and width, to facilitate engagement. Also, it should be appreciated, that the sense of the helical teeth 64 and 66 is determined by the nominal direction of relative rotation between the inner member 22 and the outer member 60. If the inner member 22 rotates clockwise (as viewed from the right in FIGS. 1 and 2), the helical threads 64 and 66 are of right hand sense and if the inner member 22 rotates counterclockwise, the helical threads 64 and 66 are of left hand sense.

As FIGS. 1 and 2 illustrate, when the collar or inner member 22 translates to the left, the first and second pluralities of helical teeth 64 and 66 engage and when the collar or inner member 22 translates to the right, the first and second pluralities of helical teeth 64 and 66 disengage. The engagement spring 54 biases the collar or inner member 22 to the left, into engagement. As the rotational speed of the rotating member 14 increases, radially outwardly flowing hydraulic fluid (transmission oil) from the transmission 10 is collected and directed by the circular lubrication dam 40 into the fluid chamber 34. As fluid pressure within the chamber 34 increases, the force of the engagement spring 54 will be overcome, the collar or inner member 22 translates to the right in FIGS. 1 and 2 and the helical teeth 64 and 66 disengage completely. As noted above, the angle of the helical teeth 64 and 66, the magnitude of the hydraulic force and the force of the engagement spring 54 primarily determine the one way lock and release thresholds of the one way or overrunning clutch (brake) assembly 20 according to the present invention. It should also be appreciated that the volume of the chamber 34 and the size of the annular orifice 45 will affect the speed, i.e., the elapsed time, for the chamber 34 to fill and disengage the helical teeth 64 and 66, with a larger chamber 34 and smaller annular orifice 45 increasing the time to disengagement and vice versa.

Figure 4:
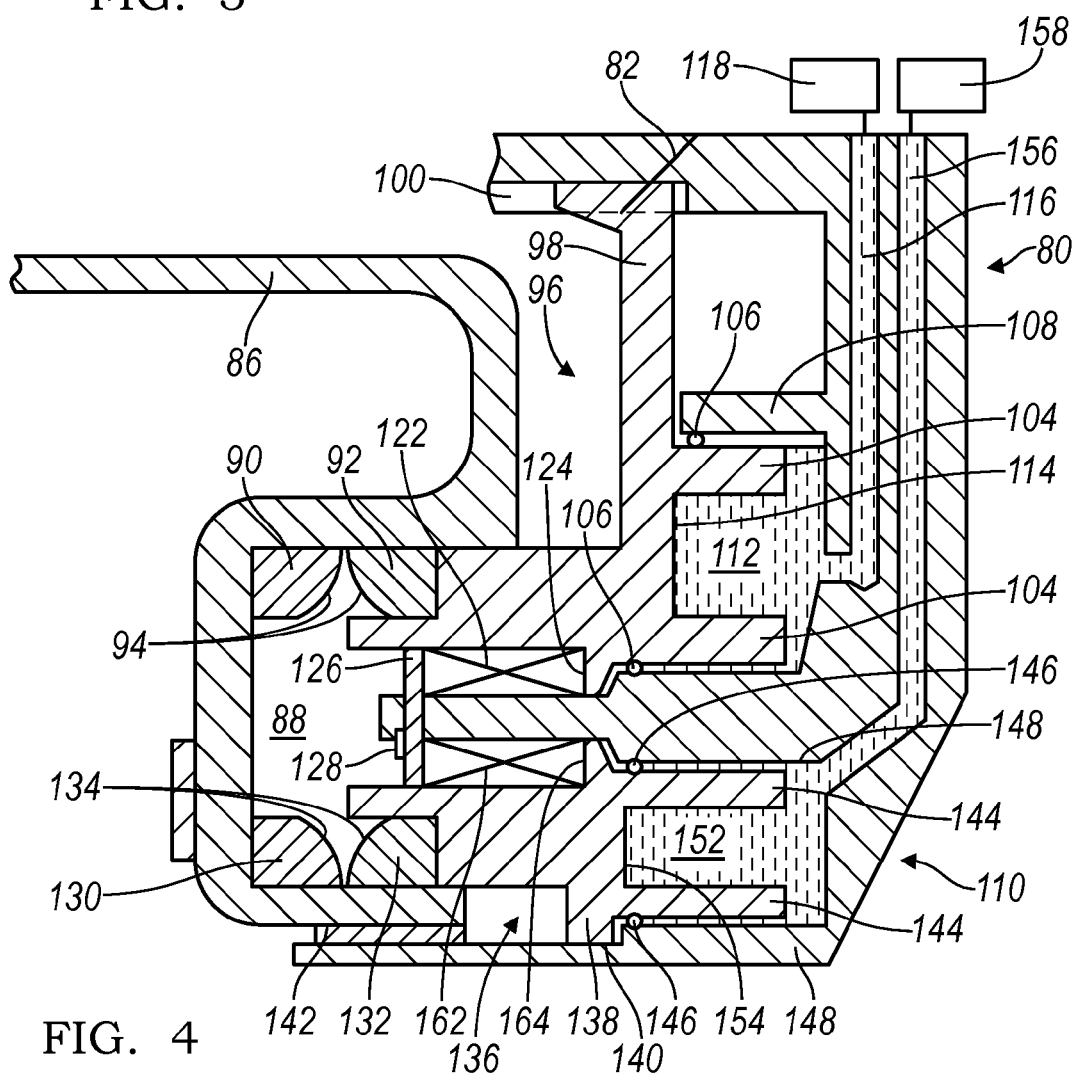
FIG. 4 is a sectional view of a second embodiment of a one way or overrunning clutch having two pairs of opposed sets of helical teeth according to the present invention.

Referring now to FIG. 4, a second embodiment of a one way or overrunning clutch assembly is illustrated and generally designated by the reference number 80. The second embodiment one way clutch assembly 80 is bi-directional and selectively functions as a one way clutch (brake) to react torque or overrun in both forward and reverse directions, freewheel and react torque in both directions. The second embodiment one way clutch 80 may also be disposed in a motor vehicle transmission or other torque or power transmission device which includes a stationary housing 82. The transmission includes a shaft, quill or other rotating member 86 which provides drive or input torque to the one way clutch assembly 80. The shaft, quill or rotating member 86 includes an annular, re-entrant region 88 which receives a first set of helical teeth 90 of a first sense (either right hand or left hand) which are secured to or integrally formed with the rotating member 86 and a second set of helical teeth 130 of a second, opposite sense (either left hand or right hand) which are also secured to or integrally formed with the rotating member 86.

Disposed opposite and in axial alignment with the first set of helical teeth 90 of the first sense are a complementary second set of helical teeth 92 of the first sense. The sets of helical teeth of the first sense 90 and 92 are like those illustrated in FIG. 3 and include tapered terminal or end regions 94 of reduced width and height which facilitate smooth engagement. The second set of teeth 92 of the first sense are secured to or integrally formed with a first non-rotating piston assembly 96. The first piston assembly 96 includes a radially extending flange or web 98. An interengaging spline set 100 or similar rotation inhibiting connection operably disposed between the periphery of the web or flange 98 and the housing 82 inhibits rotation of the first piston assembly 96 but allows axial motion of the first piston assembly 96 relative to the housing 82.

The first piston assembly 96 includes a first pair of annular walls 104 which include a suitable first pair of O-ring seals 106 on their outer surfaces which provide a fluid tight seal against a complementary first pair of annular walls 108 carried by a stationary hub 110. The stationary hub 110 is secured to the stationary housing 82. The complementary pair of annular walls 108 define a first cylinder 112 which receives the first pair of annular walls 104 which thus function as a first piston 114 albeit a hollow piston. The stationary hub 110 includes a first fluid passageway 116 which communicates between a first controlled source 118 of pressurized hydraulic fluid (transmission oil) and the first cylinder 112. A first compression spring pack 122 which may be a plurality of compression springs or a plurality of wave washers, for example, is disposed between a first lip or flange 124 in the first piston assembly 96 and a circular stop or washer 126 restrained by a snap ring 128 or similar device and biases the first piston assembly 96 to the right in FIG. 4, to a disengaged, freewheeling position.

As noted above, a second set of helical teeth 130 of a second sense (either left hand or right hand) are also secured to or integrally formed with the rotating member 86. Disposed opposite and in axial alignment with the second set of helical teeth 130 of the second sense are a complementary second set of helical teeth 132 of the second sense. The sets of helical teeth of the second sense 130 and 132 are like those illustrated in FIG. 3 and include terminal regions 134 of reduced width and height which facilitate smooth engagement. The second set of teeth 132 of the second sense are secured to or integrally formed with a second non-rotating piston assembly 136. The second piston assembly 136 includes a radially inwardly extending flange or web 138. An interengaging spline set 140 or similar rotation inhibiting connection operably disposed between the periphery of the web or flange 138 and the stationary hub 110 inhibits rotation of the second piston assembly 136 but allows axial motion of the second piston assembly 136 relative to the stationary hub 110. Disposed between the end of the stationary hub 110 and the adjacent, inner end of the shaft, quill or rotating member 86 is a roller, needle or similar bearing assembly 142.

The second piston assembly 136 includes a second pair of annular walls 144 which include a suitable second pair of O-ring seals 146 on their outer surfaces which provide a fluid tight seal against a complementary second pair of annular walls 148 in the stationary hub 110. The complementary pair of annular walls 148 define a second cylinder 152 which receives the second pair of annular walls 144 of the second piston assembly 136 which thus function as a second piston 154 albeit a hollow piston. The stationary hub 110 includes a second fluid passageway 156 which communicates between a second controlled source 158 of pressurized hydraulic fluid (transmission oil) and the second cylinder 152. A second compression spring pack 162 which may be a plurality of compression springs or a plurality of wave washers, for example, is disposed between a second lip or flange 164 in the second piston assembly 136 and the circular stop or washer 126 restrained by the snap ring 128 or similar device and biases the second piston assembly 136 to the right in FIG. 4, to a disengaged, freewheeling position.

In operation, the second embodiment one way clutch 80, as noted above, is bi-directional and selectively functions as a one way clutch to transmit or react torque or overrun in both forward and reverse directions or freewheel depending upon whether the first piston assembly 96 or the second piston assembly 136 is activated. With regard to the first piston assembly 96, the first set of helical teeth 90 and the second set of helical teeth 92 of the first sense, the first compression spring pack 122 biases the second set of helical teeth 92 to the right in FIG. 4, out of engagement.

Assuming the first and second sets of helical teeth 130 and 132 of the opposite (second) sense are disengaged, no torque transfer or torque reaction occurs through the one way clutch 80 and it freewheels in both directions. When pressurized hydraulic fluid is supplied to the first cylinder 112 from the controlled source 118 through the first fluid passageway 116, the first piston assembly 96 translates to the left in FIG. 4 and the first set of helical teeth 90 and the second set of helical teeth 92 of the first sense engage. Depending upon the force generated by the first piston 114, the angle of the first and second sets of helical teeth 90 and 92 and the torque and the direction of torque applied thereto, the helical teeth 90 and 92 may remain engaged and transmit or react torque or they may overrun.

Operation of the second piston assembly 136, the first set of helical teeth 130 and the second set of helical teeth 132 of the second, opposite sense is essentially the same except that all directional (rotational) actions are the reverse of that occurring with the regard to the first piston assembly described directly above. When both the first piston assembly 96 and the second piston assembly 136 are activated, both the sets of helical teeth 90 and 92, and 130 and 132 engage and the shaft, quill or other rotating member 86 is inhibited from rotation in either direction.

The description of the invention is merely exemplary in nature and variations that do not depart from the gist of the invention are intended to be within the scope of the invention. Such variations are not to be regarded as a departure from the spirit and scope of the invention.

What is claimed is:

1. A one way or overrunning clutch assembly for a transmission comprising, in combination,
   an annular input member, said annular input member defining an annular re-entrant region, a lubrication dam adjacent said input member, said lubrication dam cooperating with said annular re-entrant region of said input member to provide a fluid chamber, and a first plurality of helical teeth on said input member, an output member and a second plurality of helical teeth on said output member and aligned with said first plurality of helical teeth, and means for biasing said first and said second pluralities of helical teeth into engagement, whereby hydraulic fluid in said fluid chamber translates said first and second pluralities of helical teeth out of engagement.

2. The one way or overrunning clutch assembly of claim 1 wherein said means for biasing is a wave washer.

3. The one way or overrunning clutch assembly of claim 1 wherein said output member is stationary.

4. The one way or overrunning clutch assembly for a transmission of claim 1 further including a circumferential surface adjacent said first plurality of helical teeth and extending about said annular input member and an annular surface adjacent said second plurality of helical teeth, extending about said output member and in contact with said circumferential surface of said input member.

5. A one way clutch assembly for a motor vehicle transmission comprising, in combination, an input member having first plurality of helical teeth, said input member defining a re-entrant region, a lubrication dam adjacent said input member, said lubrication dam forming a fluid chamber with said re-entrant region of said input member, a stationary output member having a second plurality of helical teeth aligned and engageable with said first plurality of helical teeth, and spring means for biasing said first and said second pluralities of helical teeth into engagement, whereby hydraulic fluid in said fluid chamber translates said first and second pluralities of helical teeth out of engagement.

6. The one way clutch of claim 5 wherein said lubrication dam directs a radially outward flow of hydraulic fluid into said chamber.

7. The one way clutch of claim 5 wherein said input member is disposed on and driven by a rotating input member.

8. The one way clutch of claim 5 wherein said spring means is one of a wave washer and a plurality of compression springs.

9. The one way clutch assembly of claim 5 wherein said stationary output member is coupled to a transmission housing.

10. An overrunning clutch assembly for a transmission comprising, in combination, a first member, said first member defining an annular re-entrant region, a lubrication dam adjacent said first member, said lubrication dam cooperating with said annular re-entrant region of said first member to form a fluid chamber, a first plurality of helical teeth disposed on said first member, and a circumferential surface adjacent said first plurality of helical teeth extending about said first member, a second member, a second plurality of helical teeth disposed on said second member and aligned with said first plurality of helical teeth, and an annular surface adjacent said second plurality of helical teeth extending about said second member and engaging said circumferential surface of said first member, means for biasing said first and said second pluralities of helical teeth into engagement, whereby pressurized hydraulic fluid in said fluid chamber translates said first and second pluralities of helical teeth out of engagement.

11. The overrunning clutch assembly of claim 10 wherein said means for biasing is one of a wave washer and Belleville spring.

12. The overrunning clutch assembly of claim 10 wherein said second member is stationary and is coupled to a transmission housing.

13. The overrunning clutch assembly of claim 10 wherein said first member is an input member and said second member is an output member.

* * * * *